United States Patent
Grover et al.

(10) Patent No.: US 9,996,335 B2
(45) Date of Patent: Jun. 12, 2018

(54) CONCURRENT DEPLOYMENT IN A NETWORK ENVIRONMENT

(71) Applicant: CISCO TECHNOLOGY, INC., San Jose, CA (US)

(72) Inventors: Rajiv Kumar Grover, Pacifica, CA (US); Anthony Gordon Kent, San Jose, CA (US); Stephen Andrew Bechtold, Danville, CA (US); Arvind Krishnan, San Jose, CA (US); Jason Varkey Cheruvatoor, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 139 days.

(21) Appl. No.: 15/053,879

(22) Filed: Feb. 25, 2016

(65) Prior Publication Data

US 2017/0249134 A1 Aug. 31, 2017

(51) Int. Cl.
G06F 9/44 (2018.01)
G06F 9/445 (2018.01)

(52) U.S. Cl.
CPC .................... *G06F 8/65* (2013.01)

(58) Field of Classification Search
CPC ............................ G06F 8/65–8/71
USPC ................................ 717/168–173
See application file for complete search history.

(56) References Cited

U.S. PATENT DOCUMENTS

| | | | | |
|---|---|---|---|---|
| 7,584,467 B2* | 9/2009 | Wickham | .......... | G06F 8/65 717/171 |
| 8,370,479 B2* | 2/2013 | Hart | .......... | H04L 41/0681 709/224 |
| 8,522,231 B2* | 8/2013 | Arcese | .......... | G06F 8/61 709/219 |
| 8,572,679 B1* | 10/2013 | Wang | .......... | G06F 8/65 370/328 |
| 8,756,318 B1* | 6/2014 | Reus | .......... | G06F 15/16 709/217 |
| 8,856,774 B1* | 10/2014 | Kulaga | .......... | G06F 8/65 717/168 |
| 8,978,024 B2* | 3/2015 | Bower, III | .......... | G06F 8/71 717/168 |
| 9,311,066 B1* | 4/2016 | Garman | .......... | G06F 8/60 |
| 9,411,621 B2* | 8/2016 | Jeswani | .......... | G06F 9/45533 |
| 9,626,180 B2* | 4/2017 | Barrat | .......... | G06F 8/67 |
| 9,696,982 B1* | 7/2017 | Michalik | .......... | G06F 8/65 |
| 2004/0031029 A1* | 2/2004 | Lee | .......... | G06F 8/65 717/171 |
| 2006/0080656 A1* | 4/2006 | Cain | .......... | G06F 8/65 717/174 |

(Continued)

OTHER PUBLICATIONS

Kuusisto, Esa. "Centralized data center provisioning and configuration in managed service provider environment." (May 22, 2012)—Helsinki Metropolia University of Applied Sciences.*

(Continued)

*Primary Examiner* — Francisco Aponte
(74) *Attorney, Agent, or Firm* — Polsinelli PC (57) ABSTRACT

Particular embodiments described herein provide for a communication system that can be configured to receive a request for an update to a plurality of devices in a system, determine an amount of time to deploy the update, and que a deployment of the update for a least total wait time. In an example, the update is an operating system update.

17 Claims, 6 Drawing Sheets

(56) References Cited

U.S. PATENT DOCUMENTS

| | | | | |
|---|---|---|---|---|
| 2007/0294385 | A1* | 12/2007 | Kapadekar | G06F 8/65 709/223 |
| 2009/0241100 | A1* | 9/2009 | Sakurai | G06F 11/1433 717/170 |
| 2012/0210315 | A1* | 8/2012 | Kapadekar | G06F 8/65 717/172 |
| 2015/0040113 | A1* | 2/2015 | Muench-Casanova | G06F 9/4406 717/168 |
| 2016/0092203 | A1* | 3/2016 | Filali-Adib | G06F 8/67 717/171 |
| 2016/0132805 | A1* | 5/2016 | Delacourt | G06Q 10/06313 705/7.23 |
| 2016/0246586 | A1* | 8/2016 | Madanapalli | G06F 8/65 |
| 2016/0323288 | A1* | 11/2016 | Peterson | H04L 63/102 |
| 2016/0350098 | A1* | 12/2016 | Kuchibhotla | G06F 8/65 |
| 2017/0180346 | A1* | 6/2017 | Suarez | H04L 63/083 |
| 2017/0364345 | A1* | 12/2017 | Fontoura | G06F 8/65 |

OTHER PUBLICATIONS

Centralized Data Center Provisioning and Configuration in Managed Service Provider Environment—Esa Kuusisto; Helsinki Metropolia University of Applied Sciences ,Degree (Master's Degree), Degree Programme (Information Technology); Thesis (Master's Thesis), Date (May 22, 2012).*

Priority based task scheduling by mapping conflict-free resources and Optimized workload utilization in cloud computing; Anagha Yadav and Prof. S. B. Rathod, Sinhgad Academy of Engineering—(ICCUBEA), 2016; India.*

* cited by examiner

CONCURRENT DEPLOYMENT IN A NETWORK ENVIRONMENT

TECHNICAL FIELD

This disclosure relates in general to the field of communications and, more particularly, to concurrent deployment in a network environment.

BACKGROUND

A computer network or data network is a telecommunications network which allows computers to exchange data. In computer networks, networked computing devices exchange data with each other along network links or data connections. The connections between nodes are established using either cable or wireless media. Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. In some computer networks, the deployment of operating systems on one or more nodes and various updates can be a disjoined activity. This makes the process complex and cumbersome in large scaled environments with many networked nodes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

A method is provided in one example and includes receiving a request for an update to a plurality of devices in a system, determining an amount of time to deploy the update, and queuing a deployment of the update for a least total wait time. In an example, the update is an operating system update. In one implementation, a weight is assigned to the update and the update can be joined with other updates that have the same weight. Also, the update can be joined with other updates that have the same deployment time.

In some instances, the update can be deployed from a trivial file transfer protocol (TFTP) server. In a specific instance, the deployment time is determined by the length of time a typical deployment of the update would take and an execution time remaining on deployments from the TFTP server that will execute the deployment of the update. Also, the weight of the OS can depend on the type of OS, for example if the deployment of the OS uses any special dependencies, etc.

Example Embodiments

Figure 1:
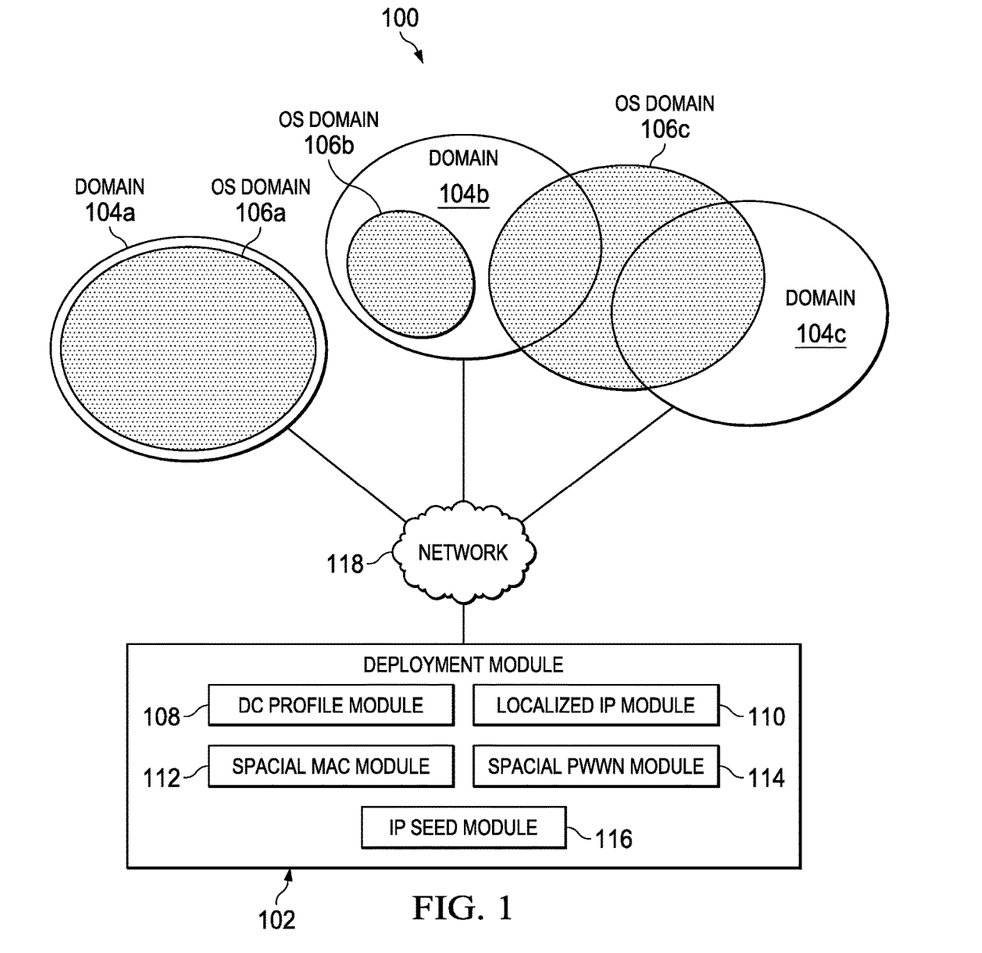
FIG. 1 is a simplified block diagram of a communication system in accordance with one embodiment of the present disclosure.

Turning to FIG. 1, FIG. 1 is a simplified block diagram of a communication system 100 for concurrent deployment in a network environment in accordance with one embodiment of the present disclosure. Communication system 100 can include a plurality of domains 104a-104c and a deployment module 102. Each one of plurality of domains 104a-104c can be in communication with deployment module 102 using network 118.

Deployment module 102 can include a data center (DC) profile module 108, a localized IP provisioning module 110, a spacial media access control (MAC) provisioning module 112, a spacial port worldwide name (PWWN) provisioning module 114, and an Internet protocol (IP) seed generation module 116. Each one of plurality of domains 104a-104c are separate physical groups of networked nodes and can include at least a portion of one or more operating system (OS) domains. For example, domain 104a can include OS domain 106a, domain 104b can include OS domain 106b and a portion of OS domain 106c, and domain 104c can include a portion of OS domain 106c.

Communication system 100 can be configured to allow concurrent deployment of one or more OSs and updates in a network environment. In an example, each one of plurality of domains 104a-104c can include servers (both physical and virtual), blade serves, containers, etc. and each one of plurality of domains 104a-104c can be configured as a unified computing system or some other networked type of domain or system. Each OS domain 106a-106c can be configured to include an OS (e.g., Red Hat, SLES, Citrix, VMWare, etc.).

In some examples, deployment module 102 can be configured with an execution and structural algorithm for concurrent deployment of an OS or updates in a network environment. Deployment module 102 can be configured to enable OS domain overlay algorithms to define OS domains in plurality of domains 104a-104c for OS deployments and smart transparent driver updates with a single click. In addition, deployment module 102 can be configured to allow a hands off concurrent homogeneous OS deployment algorithm for concurrent deployment in a network environment. DC profile module 108 can be configured to determine a cohesive DC profile for all devices in domains 104a-104c. Localized IP provisioning module 110 can be configured to provision the IPs for each device in domains 104a-104c. IP seed module 116 can be configured to provide seed for IPs provisioned by localized IP provisioning module 110 so that the IPs between domains 104a, 104b, and 104c are unique. Spacial MAC module 112 can be configured, using an algorithm, to define the MAC address of each device in domains 104a-104c based on the device's placement in the data center. Spacial PWWN module 114 can be configured, using an algorithm, to define the PWWN of each device in domains 104a-104c based on the device's placement in the data center.

For purposes of illustrating certain example techniques of communication system 100, it is important to understand how typical communications may traverse the network. The following foundational information may be viewed as a basis from which the present disclosure may be properly explained.

In some network domains, especially bladed systems, various permutations and combinations of blades, servers, adapters and drivers need to be tested with various OS releases from multiple vendors. Due to limitations of current OS deployment technologies, this testing tends to be manual in various degrees. Existing automation tools have covered only OS vendor specific deployment mechanisms that would, at best, cater to a specific OS or OS family or specific vendors requiring multiple deployment infrastructure harnesses and/or agents. Additionally, current OS deployment technologies are mostly limited to a single OS per server deployment at a time. Deploying multiple OSs from varied vendors can become complex when driver injection and multipathing is required at or post boot time to accommodate specifics of each OS. This can make OS deployment and driver updates a disjointed activity and make the process complex and cumbersome to deploy and maintain. What is needed is a system and method for concurrent deployment of an OS and other updates in a network environment.

A communication system, as outlined in FIG. 1, can resolve these issues (and others). Communication system 100 may be configured for concurrent deployment of an OS and other updates in a network environment. One example implements a concept through two main components or concepts working together; a common domain profile (e.g., common profile for OS domains 106a-106c) and temporal profiles with a gate check provisioning algorithm to deploy OSs and driver updates in various OS domains, concurrently.

Based on the common domain profile, an automation core can proliferate dynamic host configuration protocol (DHCP) stanzas for servers, vectored to multiple trivial file transfer protocol (TFTP) servers. IPs can be programmatically allocated with a seed in private subnets for contiguous IP space for accountability and security or from a pool in a declared IP space to derive the temporal profile. A core can orchestrate multiple TFTPs concurrently by setting and resetting pxelinux.cfg, a network boot program (NBP) configuration file, to the correct labels and dependencies for the OS definition files like kickstarts. A gate check provisioning algorithm can be used to spread, consolidate, or hold multi-OS domain requests for deployment. The algorithm can determine the current execution context and complexity weight of the OSs being deployed, measure the complexity of execution of the new request based on the OS release deployment time, pre and post deployment complexity (e.g., multipathing enablement with initrd in sles11.1) and dependencies like specific pxelinux.0 versions. The system can then assign the request to TFTP in the DHCP stanza with best fit complexity weight.

In an illustrative example, if the OS release Red Hat 6.5 is already being deployed in a domain (e.g., domain 106a-106c), depending on its current state, a new request of Red Hat 6.5 in the same domain may join that execution context. If an ESX deployment request is received at the same time as the Red Hat deployment, the ESX deployment request gets priority due to lesser complexity weight. If a new request arrives and a TFTP is available, the new request will be assigned right away. If no TFTP is available and the request cannot join an executing OS context, the request gets queued on an TFTP that has a least total execution complexity weight (e.g., total execution complexity weight can be equal to the time remaining plus new request complexity). Concurrency of deployment can be achieved by using specific features of servers, chassis, and blade resetting at the same time.

Figure 5:
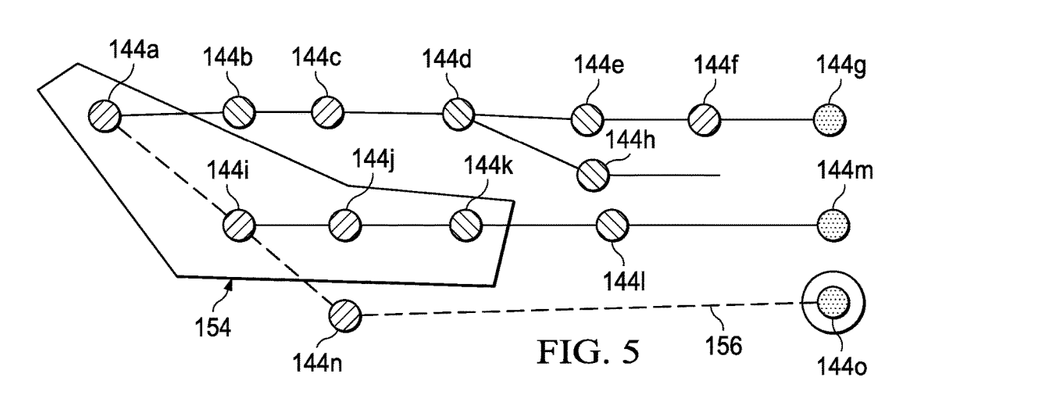
FIG. 5 is simplified block diagram of a portion of a communication system in accordance with one embodiment of the present disclosure.

A smart driver update algorithm can be associated with the OS deployment. For example, in OS domain profile 146, each line element can provide a finer granularity in the execution context of a particular hardware combination that, like cogs, dynamically builds and engages a unique vector (directory path) into the driver deployment repository structure and into a specific driver type. The vector activates pre and post methods for that driver deployment. The repository structure can be laid out to abstract the hardware, OS, and adapters in an efficient manner to be able to build a vector example that includes a release component, blade type component, OS component, OS release component, adapter component, driver component, and driver type component. No particular order of arrangement in the repository needs to be defined so long as a minimum set of anchor points are met to build a unique vector into the driver. For example, as illustrated in FIG. 5, driver anchor points 144g, 144m, and 144o form the end points to reach the appropriate driver. In the path using anchor points 144a, 144i, 144j, 144k, 144l only anchor points 144a-k are needed to uniquely identify driver anchor point 144m in all the paths in the repository. Non-anchors do not need to be used in the path. The vector can dynamically change based on the execution context of each element in the OS domain profile, thus transparently updating drivers for each element of the OS domain profile, all from the same device or harness. This can be done serially or concurrently to deploy drivers on all blades at the same time.

The naming convention can effectively define an OS deployment domain overlaid on multiple domains. For example, the naming convention can define OS domain 106c in domain 104b and 104c. In an illustrative example, an OS deployment domain can include a few blades on one chassis, a few blades from multiple chassis in a domain, or a few blades from a few chassis from multiple domains. The OS deployment domain can also span all blades in multiple domains. Multiple OS deployment domains can also be defined to deploy different OSs/OS versions concurrently across different OS deployment domains. Deployment module 102 can be configured to provide a single click OS deployment solution that provides algorithms/mechanisms to deploy the same OS/version concurrently across different servers from the same harness across different domains along with the corresponding driver updates and can deploy multi-vendor OSs (e.g., Red Hat, SLES, Citrix, VMWare) from the same harness. Current solutions require deployment of agents to detect and deploy drivers. Communication system 100 can be agentless and deploy drivers and OSs with a deterministic vector. Additionally, the system can be tied to hardware discovery/blueprinting being mapped to structured driver repository (e.g., ISO) to build a vector into the exact driver and deployment context.

Turning to the infrastructure of FIG. 1, communication system 100 in accordance with an example embodiment is shown. Generally, communication system 100 can be implemented in any type or topology of networks. Network 118 represents a series of points or nodes of interconnected communication paths for receiving and transmitting packets of information that propagate through communication system 100. Network 118 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 118 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, deployment module 102, domains 104a-104c, and OS domains 106a-106c are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for the effective exchange of data or information.

In one implementation, network elements implementing the concurrent deployment in a network environment features described herein may include software to achieve (or to foster) the functions discussed herein for providing and processing when the software is executed on one or more processors to carry out the functions. This could include the implementation of instances of modules and/or any other suitable element that would foster the activities discussed herein. Additionally, each of these elements can have an internal structure (e.g., a processor, a memory element, etc.) to facilitate some of the operations described herein. In other embodiments, these functions for the concurrent deployment in a network environment may be executed externally to these elements, or included in some other network element to achieve the intended functionality. Alternatively, network elements may include software (or reciprocating software) that can coordinate with other network elements in order to achieve the concurrent deployment in a network environment functions described herein. In still other embodiments, one or several devices may include any suitable algorithms, hardware, software, components, modules, interfaces, or objects that facilitate the operations thereof.

In regards to the internal structure associated with communication system 100, deployment module 102 can include memory elements for storing information to be used in the operations outlined herein. Deployment module 102 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the concurrent deployment in a network environment functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the concurrent deployment in a network environment functions, as outlined herein. Additionally, each of these devices may include a processor that can execute software or an algorithm to perform the concurrent deployment in a network environment activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100, for example, deployment module 102, may include software modules (e.g., DC profile module 108, localized IP module 110, spacial MAC module 112, spacial PWWN module 114, and IP seed module 116) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, deployment module 102 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Deployment module 102 can be a network element and be a part of or include, for example, desktop computers, servers, workstations, laptop computers, mobile devices, personal digital assistants, smartphones, tablets, or other similar devices. A server can be a network element such as a physical server or virtual server and can be associated with clients, customers, endpoints, or end users wishing to initiate a communication in communication system 100 via some network (e.g., network 118). The term 'server' is inclusive of devices used to serve the requests of clients and/or perform some computational task on behalf of clients within communication systems 100.

Figure 2:
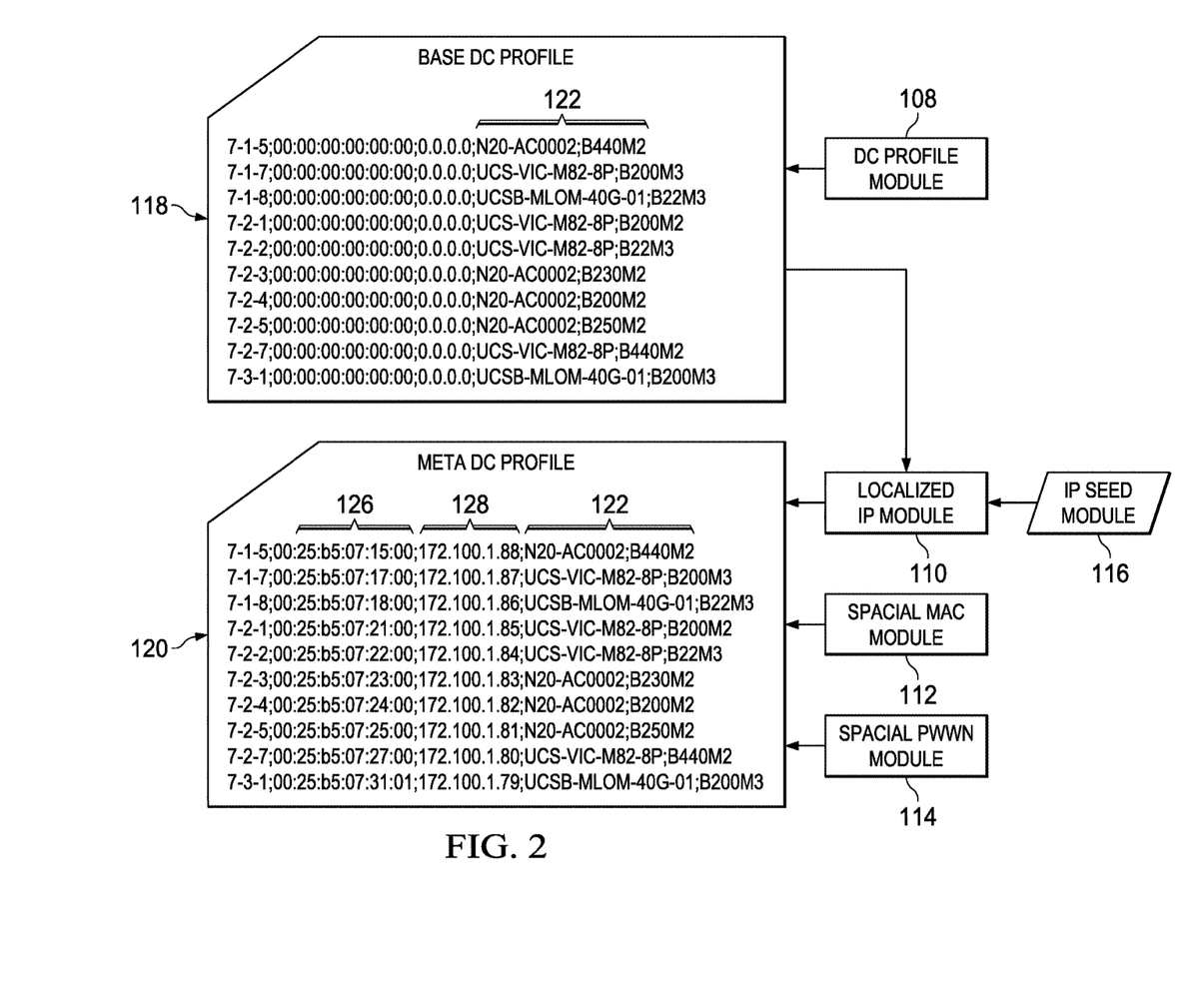
FIG. 2 is simplified block diagram of a portion of a communication system in accordance with one embodiment of the present disclosure.

Turning to FIG. 2, FIG. 2 is a simplified block diagram of a communication system 100 for concurrent deployment in accordance with one embodiment of the present disclosure. In an example, DC profile module 108 can generate a base DC profile 118 for deployment of an OS or update. Base DC profile 118 can include blade data 122.

A unique naming convention/algorithm can also be defined to encapsulate a blade's location in a lab/data center. The naming convention can be used to define port WWNs and MACs in each blade in a DC for easy location and SAN zone/Lun security configuration and triage (e.g., DCBmAx where D is domain, C the chassis number or identifier, Bm is the blade number or identifier, and Ax is the adapter number or identifier). This algorithm can be employed by, included in, or used by spacial MAC module 112 and spacial PWWN module 114.

Base DC profile 118 can be communicated to localized IP module 110, spacial MAC module 112, spacial PWWN module 114, and IP seed module 116 to create meta DC profile 120. Meta DC profile 120 can include a unique hardware identifier 126 and an IP address 128 for each blade data 122. Meta DC profile 120 consolidates all domains and can be used to identify each device in multiple domains 104a-104c were an OS is being deployed or to where an update is being sent.

Figure 3:
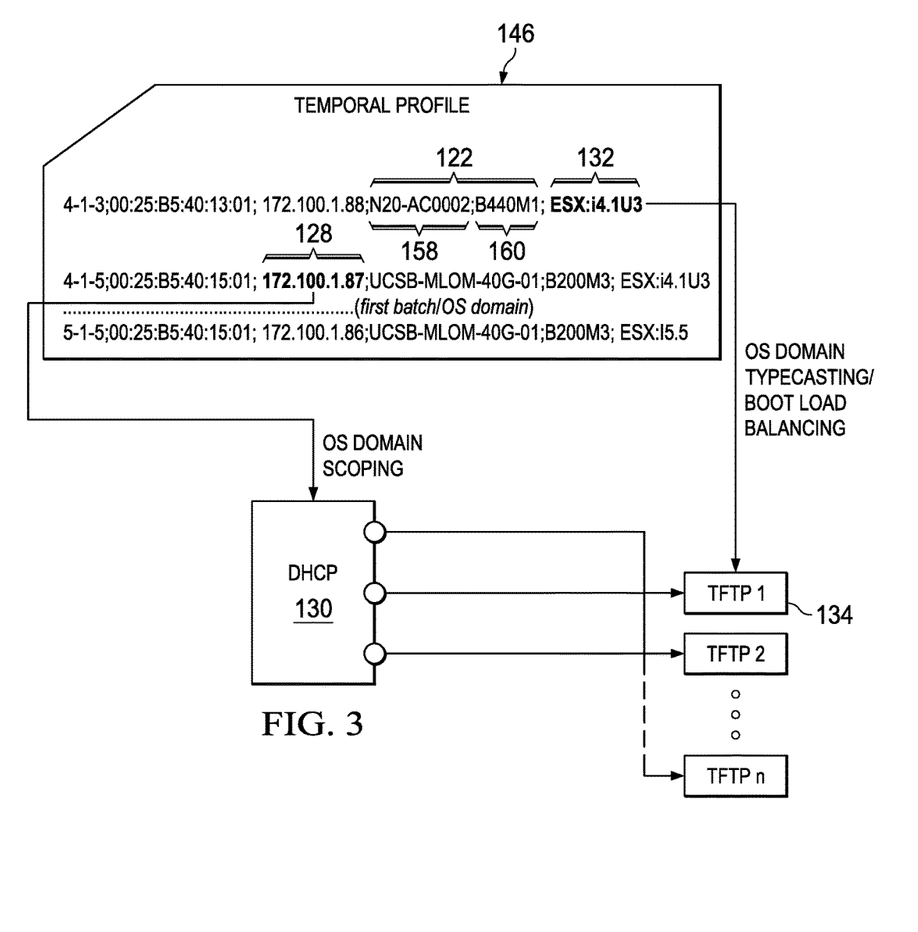
FIG. 3 is simplified block diagram of a portion of a communication system in accordance with one embodiment of the present disclosure.

Turning to FIG. 3, FIG. 3 is a simplified block diagram of a communication system 100 for concurrent deployment in accordance with one embodiment of the present disclosure. In an example, a temporal profile 146 can be created or derived using meta DC profile 120. Temporal profile 146 can include blade data 122, IP address 128, and an OS domain typecasting/boot load balancing identifier 132. Blade data 122 can include an adapter identifier 158 and a server model 160. IP address 128 can be provided by localized IP module 110 using the IP seed module 116 and OS domain scoping using DHCP 130. OS domain typecasting/boot load balancing identifier 132 can define an OS targeted for an identified blade and can determine the appropriate TFTP server 134 to be used by that blade.

Figure 4:
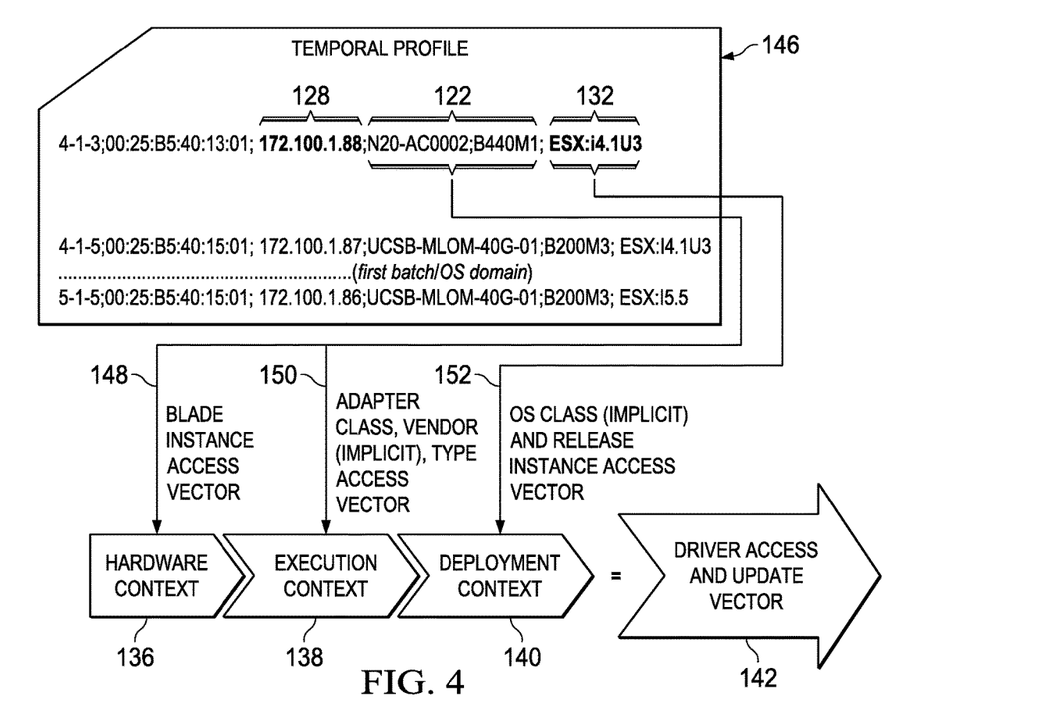
FIG. 4 is simplified block diagram of a portion of a communication system in accordance with one embodiment of the present disclosure.

Turning to FIG. 4, FIG. 4 is a simplified block diagram of a communication system 100 for concurrent deployment in accordance with one embodiment of the present disclosure. In an example, temporal profile 146 can include a hardware context 136, an execution context 138, and a deployment context 140. Hardware context 136, execution context 138, and deployment context 140 can be combined by deployment module 102 to create a driver access and update vector 142. Driver access and update vector 142 can be used by communication system 100 for the concurrent deployment of OSs and driver updates in a network environment.

Hardware context 136 can be derived from a blade instance access vector 148 from blade data 122. For example, hardware context 136 can be derived from server model 160 in blade data 122 (illustrated in FIG. 3). Execution context 138 can be derived from an adapter class, vendor, adapter type access vector 150 from blade data 122. For example, execution context 138 can be derived from adapter identifier 158 in blade data 122 (illustrated in FIG. 3). Deployment context 140 can be derived from an OS class and release instance access vector 152 from OS domain typecasting/boot load balancing identifier 132.

Turning to FIG. 5, FIG. 5 is a simplified block diagram of a communication system 100 for concurrent deployment in accordance with one embodiment of the present disclosure. FIG. 5 illustrates a graphic representation of the logic in identifying the driver access and update vector. In an example, anchor points 144a-144o are used for building drivers layout metadata structure and vector building for unique access. A minimum set of anchors should match irrespective of the order and whether non-anchors are present. A limiting example can include an ordered hierarchical layout without any non-anchors. Grouping 154 represents a minimal set of anchor points 144a, 144i, 144j, and 144k that match for a unique vector to a driver, where anchor point 144l is shown as a non-anchor. In an example, path 156 represents a driver access vector that includes one complete path line with anchors and non-anchors included. Driver anchor point 144o represents a driver and driver context for an update.

Figure 6:
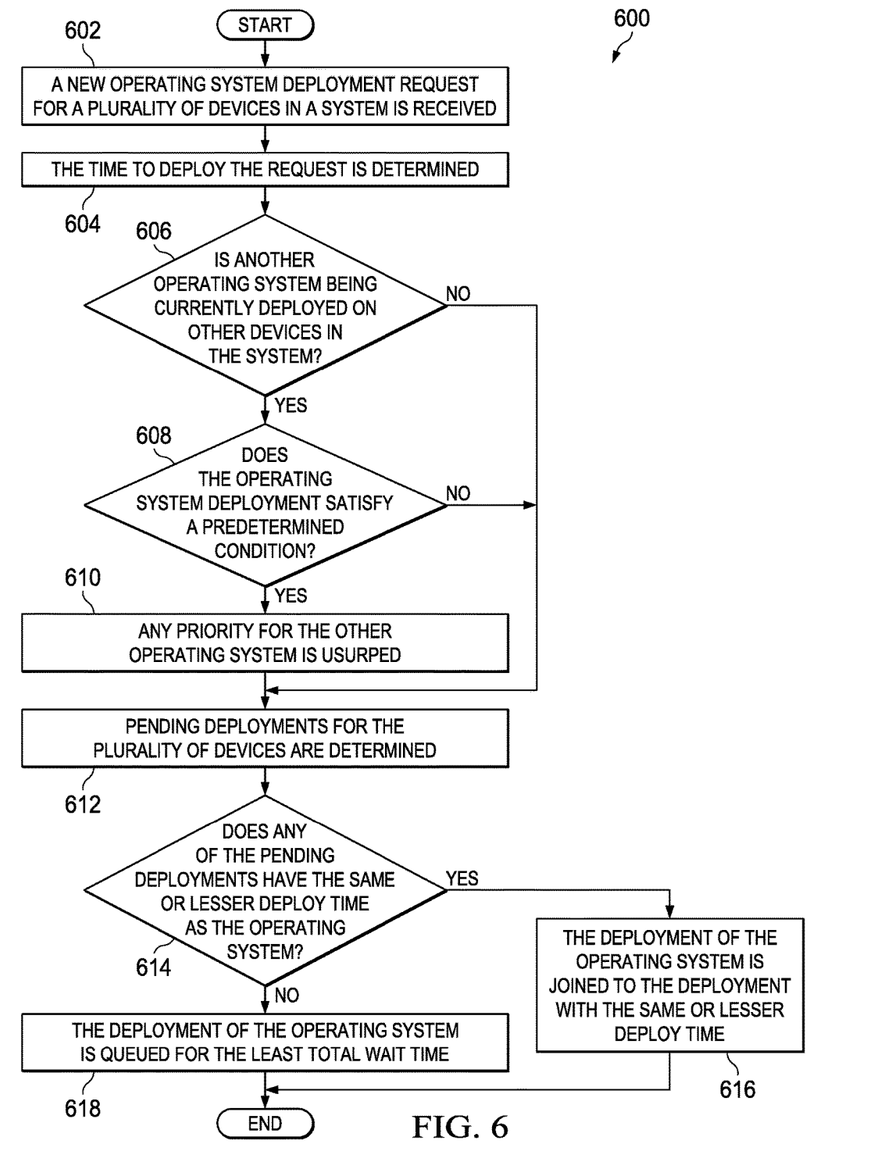
FIG. 6 is a simplified flowchart illustrating potential operations associated with the communication system.

Turning to FIG. 6, FIG. 6 is an example flowchart illustrating possible operations of a flow 600 that may be associated with concurrent deployment in a network environment, in accordance with an embodiment. In an embodiment, one or more operations of flow 600 may be performed by deployment module 102. At 602, a new OS deployment request for a plurality of devices in a system is received. At 604, the time to deploy the request is determined. For example, the time to deploy the request could be determined by the length of time a typical deployment of the OS would take, an execution time remaining on deployments from a TFTP that will execute the deployment or how much time a current deployment of an OS is remaining on the TFTP that the OS deployment will be queued on plus the weight or priority of the OS. The weight of the OS can depend on the type of OS, for example if the deployment of the OS uses any special dependencies, etc. At 606, the system determines if another OS is being currently deployed on other devices in the system. If another OS is not being currently deployed on other devices in the system, the pending deployments for the plurality of devices are determined, as in 612. For example, the weight of the pending deployments can be determined. If another OS is being currently deployed on other devices in the system, then the system determines if the OS deployment satisfies a predetermined condition, as in 608. For example, the predetermined condition may be a high priority OS deployment. If the OS deployment does not satisfy a predetermined condition, then the pending deployments for the plurality of devices are determined, as in 612. If the OS deployment satisfies a predetermined condition, then any priority for the other OS is usurped, as in 610. At 612, the pending deployments for the plurality of devices are determined. At 614, the system determines if any of the pending deployments have the same or lesser deploy time as the OS. If any of the pending deployments have the same or lesser deploy time as the OS, then the deployment of the OS is joined to the deployment with the same deploy time, as in 616. If none of the pending deployments have the same or lesser deploy time as the OS, then the deployment of the OS is queued for the least total wait time, as in 618.

Figure 7:
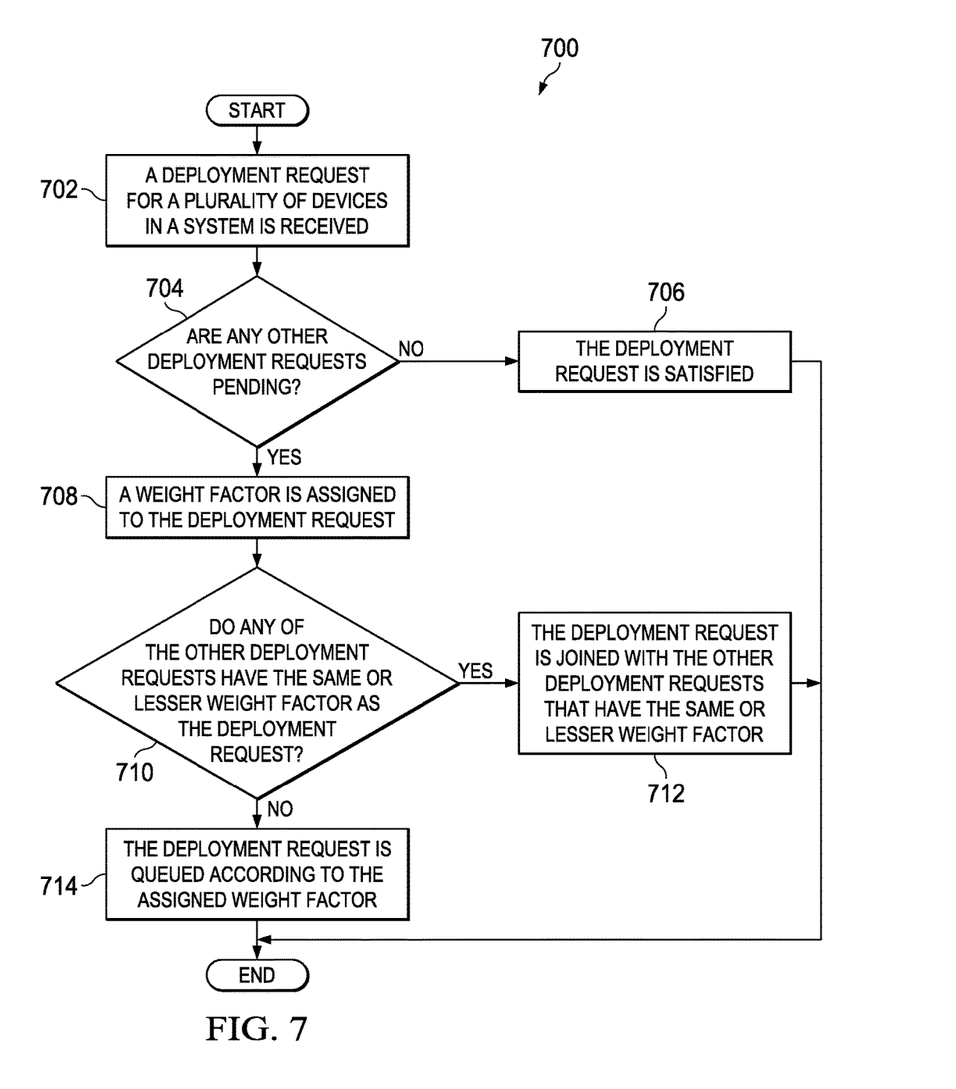
FIG. 7 is a simplified flowchart illustrating potential operations associated with the communication system.

Turning to FIG. 7, FIG. 7 is an example flowchart illustrating possible operations of a flow 700 that may be associated with concurrent deployment in a network environment, in accordance with an embodiment. In an embodiment, one or more operations of flow 700 may be performed by deployment module 102. At 702, a deployment request for a plurality of devices in a system is received. In an example, the deployment may be an update to an operating system and/or a driver update. At 704, the system determines if any other deployment requests are pending. If no other deployment requests are pending, then the deployment request is satisfied, as in 706. If other deployment requests are pending, then a weight factor is assigned to the deployment request, as in 708. At 710, the system determines if any of the other deployment requests have the same weight factor as the deployment request. If another deployment request has the same weight factor as the deployment request, then the deployment request is joined with the other deployment requests with the same weight factor as in 712. If no other deployment requests have the same weight factor as the deployment request, then the deployment request is queued according to the assigned weight factor with the least total execution weight, as in 714.

Note that in certain example implementations, the concurrent deployment in a network environment functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagram (i.e., FIGS. 6 and 7) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100. Various additional operations may be performed, and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a request for a new update to a plurality of devices in a system;
   first determining an amount of time to deploy the new update;
   second determining whether (a) another update is being currently deployed and (b) the new update satisfies a predetermined condition;
   usurping, in response to a positive outcome of the second determining, a priority of the another update;
   third determining, after the first and second determining, whether any pending deployments can be performed in the determined amount of time to deploy the new update;
   joining, in response to a positive outcome of the third determining, deployment of the any pending deployments with deployment of the new update; and
   queuing, in response to a negative outcome of the third determining, a deployment of the new update for a least a total wait time.

2. The method of claim 1, wherein the new update is an operating system and/or driver update.

3. The method of claim 1, wherein a weight is assigned to the new update.

4. The method of claim 3, wherein the new update is joined with other updates that have a same or lesser weight.

5. The method of claim 1, wherein the new update will be deployed from a trivial file transfer protocol (TFTP) server.

6. The method of claim 5, wherein the amount of time to deploy is determined by a length of time a typical deployment of the new update would take and an execution time remaining on deployments from the TFTP server that will execute the deployment of the new update.

7. Logic encoded in one or more non-transitory computer-readable media that includes code for execution and when executed by a processor, operable to perform operations comprising:
   receiving a request for a new update to a plurality of devices in a system;
   first determining an amount of time to deploy the new update;
   second determining whether (a) another update is being currently deployed and (b) the new update satisfies a predetermined condition;
   usurping, in response to a positive outcome of the second determining, a priority of the another update;
   third determining, after the first and second determining, whether any pending deployments can be performed in the determined amount of time to deploy the new update;
   joining, in response to a positive outcome of the third determining, deployment of the any pending deployments with deployment of the new update; and
   queuing, in response to a negative outcome of the third determining, a deployment of the new update for a least a total wait time.

8. The logic of claim 7, wherein the new update is an operating system and/or driver update.

9. The logic of claim 7, wherein a weight is assigned to the new update.

10. The logic of claim 9, wherein the new update is joined with other updates that have the same or lesser weight.

11. The logic of claim 7, wherein the new update will be deployed from a trivial file transfer protocol (TFTP) server.

12. The logic of claim 11, wherein the amount of time to deploy is determined by a length of time a typical deployment of the new update would take an execution time remaining on deployments from the TFTP server that will execute the deployment of the new update.

13. An apparatus, comprising:
   a memory configure to store data,
   a processor to execute instructions associated with the data,
   the apparatus being programmed to coordinate with the memory and processor to perform operations including:
      receive a request for a new update to a plurality of devices in a system;
      first determine an amount of time to deploy the new update;
      second determine whether (a) another update is being currently deployed and (b) the new update satisfies a predetermined condition;

usurp, in response to a positive outcome of the second determining, a priority of the another update;

third determine, after the first and second determining, whether any pending deployments can be performed in the determined amount of time to deploy the new update;

joining, in response to a positive outcome of the third determine, deployment of the any pending deployments with deployment of the new update; and queue, in response to a negative outcome of the third determine, a deployment of the new update for a least a total wait time.

14. The apparatus of claim 13, wherein the new update is an operating system and/or driver update.

15. The apparatus of claim 13, wherein a weight is assigned to the new update.

16. The apparatus of claim 15, wherein the new update is joined with other updates that have the same or lesser weight.

17. The apparatus of claim 13, wherein the new update will be deployed from a trivial file transfer protocol (TFTP) server and the amount of time to deploy is determined by a length of time a typical deployment of the new update would take and an execution time remaining of deployments from the TFTP server that will execute the deployment of the new update.

* * * * *